(12) United States Patent
Vijendra et al.

(10) Patent No.: US 7,620,612 B1
(45) Date of Patent: Nov. 17, 2009

(54) PERFORMING MODEL-BASED ROOT CAUSE ANALYSIS USING INTER-DOMAIN MAPPINGS

(75) Inventors: Sudhir Vijendra, White Plains, NY (US); Chao-Wei Ou, Poughkeepsie, NY (US)

(73) Assignee: EMC Corporation, Hopkinton, MA (US)

( * ) Notice: Subject to any disclaimer, the term of this patent is extended or adjusted under 35 U.S.C. 154(b) by 482 days.

(21) Appl. No.: 11/394,666

(22) Filed: Mar. 31, 2006

(51) Int. Cl.
*G06G 7/48* (2006.01)
*G06G 7/62* (2006.01)

(52) U.S. Cl. .............................. 706/16; 706/46; 706/61

(58) Field of Classification Search ........................ None
See application file for complete search history.

(56) References Cited

U.S. PATENT DOCUMENTS 5,864,662 A * 1/1999 Brownmiller et al. .......... 714/43

OTHER PUBLICATIONS

Kalyanasundaram et al., Pramod, "An Application Gateway Design for OSI-Internet Management", 1993.*
Pavlou, George, "OSI Systems Management, Internet SNMP and ODP/OMG CORBA as Technologies for Telecommunications Network Management", 1998.*
Yu et al., Haobo, "A Hierarchical Proxy Architecture for Internet-scale Event Services", 1999.*
Katker et al., Stefan, "A Generic Model for Fault Isolation in Integrated Management Systems", 1997.*

* cited by examiner

*Primary Examiner*—David R Vincent
*Assistant Examiner*—Adrian L Kennedy
(74) *Attorney, Agent, or Firm*—Krishnendu Gupta; Joseph D'Angelo

(57) ABSTRACT

A method, apparatus and computer-program product for performing a system analysis of a system is disclosed. The system is represented as a plurality of independent model domains, wherein the model domain represents selected ones of a plurality of components and the relationships among the components and the method comprises the steps of representing, as proxies, selected ones of the plurality of components of a first domain, wherein the relationships among the components are limited to direct relationships among adjacent ones of the components, wherein the first domain representation is available to a second domain, providing events occurring in the first domain to the second domain, providing a mapping between a plurality events and a plurality of observable events occurring among the proxy components of the first domain and a plurality of observable events occurring among the components of the second domain, wherein the mapping is represented as a value associating each event with each observable event, and performing the system analysis based on the mapping of events and observable events.

9 Claims, 9 Drawing Sheets

```
interface Card : MSI_Element
        "The Card class represents a type of physical container that "
        "can be plugged into another Card or HostingBoard, or is "
        "itself a HostingBoard|Motherboard in a Chassis. The Card "
        "class includes any package capable of carrying signals and "
        "providing a mounting point for PhysicalComponents, such as "
        "Chips, or other PhysicalPackages, such as other Cards."
{
};
interface UnitaryComputerSystem : MSI_Core
        "A class derived from Computersystem that represents a Desktop, "
        "Mobile, NetPC, server or other type of a single node Computer"
        "System."
    instrument {
        IsUnresponsiveInRemote    = "event:Unresponsive"
    };

REMOTE attribute boolean IsUnresponsiveInRemote
    "TRUE, if this entity was reported Unresponsive by a remote server.";

event UnresponsiveInRemote
    "This obejct is reported Unresponsive by the remote server"
    = IsUnresponsiveInRemote else FALSE;
    export UnresponsiveInRemote;

problem Unresponsive
    "The UnitaryComputerSystem is Unresponsive and causing "
    "underlying object problems"
    => UnresponsiveInRemote,
        LocalSymptoms,
        LocalSymptoms explains if IsUnresponsiveInRemote;
    export Unresponsive;
};
interface NetworkConnection : MSI_Core
        "NetworkConnection represents a generic network connection "
        "between two NetworkAdapters."
{
    instrument {
        IsDownOrFlappingInRemote = "event:DownOrFlapping"
    };

REMOTE attribute boolean IsDownOrFlappingInRemote
    "TRUE, if this entity was reported DownOrFlapping by a remote server.";

event DownOrFlappingInRemote
    "This entity was reported DownOrFlapping in a remote server"
    = IsDownOrFlappingInRemote else FALSE;
    export DownOrFlappingInRemote;

problem DownOrFlapping
    "This entity is Unstable and is causing protocol problems"
    => DownOrFlappingInRemote,
        LocalSymptoms,
        LocalSymptoms explains if IsDownOrFlappingInRemote;
    export DownOrFlapping;
};
```

FIG. 4

```
abstract interface MSI_Core : ICIM_System
"The MSI_Core class is defined to cause the local symptoms "
"for the remote problems. The symptoms are propagated via "
"Underlying relationships."
{
    propagate symptom UnderlyingLocalSymptoms
    = MSI_Core, Underlying, LocalSymptoms;

symptom LocalSymptoms
    "Symptoms on the local server causing the problem"
    = UnderlyingLocalSymptoms,
      UnderlyingLocalSymptoms explains;

};
abstract interface MSI_Element : MSI_Core
"The MSI-Element class is defined to cause the local symptoms "
"for the remote problems. The symptoms are propagated via "
"Underlying relationships. This class proxies the Down problem "
"from the remote server."
{
    instrument {
        IsDownInRemote    = "event:Down"
    };

REMOTE attribute boolean IsDownInRemote
    "TRUE, if this entity was reported Down by a remote server.";

event DownInRemote
    "This object is reported Down by the remote server"
    = IsDownInRemote else FALSE;
    export DownInRemote;

problem Down
    "The object is Down and causing underlying object problems"
    => DownInRemote,
        LocalSymptoms,
        LocalSymptoms explains if IsDownInRemote;
    export Down;
);
```

FIG. 5

PERFORMING MODEL-BASED ROOT CAUSE ANALYSIS USING INTER-DOMAIN MAPPINGS

A portion of the disclosure of this patent document contains command formats and other computer language listings, all of which are subject to copyright protection. The copyright owner, EMC Corporation, has no objection to the facsimile reproduction by anyone of the patent document or the patent disclosure, as it appears in the Patent and Trademark Office patent file or records, but otherwise reserves all copyright rights whatsoever.

BACKGROUND

This invention relates to the field of network modeling and more specifically to a simplified infrastructure modeling solution suitable for cross-domain processing.

Computer modeling is well-known technique for representing systems. Using computer models it is possible to determine the performance characteristics or behavior of systems whether the system is actually built or is proposed. However, the results of computer models in capturing the performance characteristics or behavior of systems is dependent upon the model's accuracy. In order for computer models to be useful, significant details regarding the system overall and many of its individual components must be imported into the computer model to produce accurate results.

However, the significant details needed for an accurate model requires a specialized knowledge of the system and its performance. Such specialized knowledge is typically obtained from system designers, engineers and others involved in the system's design, construction and operation.

Furthermore, as the level of system details incorporated into the computer module increases, extra computer resources, such as processing speed or memory, are required. Without the additional resources, the computer model may overburden the computer system and impose an extra ordinary long time to obtain results.

In well known method to reduce the burden on the computer resources as the model size and the number of details contained therein increases, is organize the model into common groups or domains which represent particular functions. For example, features or functions associated with the network infrastructure, e.g., hardware, may be grouped into a common infrastructure domain, while higher level functions, e.g., applications may be grouped into a common application domain. Each domain operates independently of the other, but is interrelated as the applications reside on or are hosted by the corresponding hardware element. Thus, as new information or details of existing components or additional components are added to one domain, there is little need for changes to another domain. The OSI architectural model, which is well-known and commonly used in the network arts, provides a reasonable presentation to organize network functions as the function or operation of each layer is well-known. More specifically, The OSI model refers to seven layers, where layers 1 to 4 are called lower layers and layers 5 to 7 are the upper layers. Layers 1 to 4 represent the physical layer, i.e., the hardware, the data link layer, i.e., the frame formats, the network layer, i.e., address assignment and the transport layer, i.e., errors correct.

However, as the network model is segmented into different functional domains, information must be transferred still other domains to process and correlate the information or data provided. In such cases, the cross-correlation domain requires significant information regarding each of the domains providing information and it would be expeditious to incorporate the underlying model domains. However such an incorporation of the lower layer model would defeat the purpose of the segmented domains as the cross-correlation domain model would increase in size.

Hence, there is a need in the industry for a simplified computer model approach that provides accurate results without the burden of including detailed system characteristics.

SUMMARY OF THE INVENTION

A method, apparatus and computer-program product for performing a system analysis of a system are disclosed. The system is represented as a plurality of independent model domains, wherein the model domain represents selected ones of a plurality of components and the relationships among the components and the method comprises the steps of representing, as proxies, selected ones of the plurality of components of a first domain, wherein the relationships among the components are limited to direct relationships among adjacent ones of the components, wherein the first domain representation is available to a second domain, providing events occurring in the first domain to the second domain, providing a mapping between a plurality events and a plurality of observable events occurring among the proxy components of the first domain and a plurality of observable events occurring among the components of the second domain, wherein the mapping is represented as a value associating each event with each observable event, and performing the system analysis based on the mapping of events and observable events.

Other embodiments of the invention include a computerized device, configured to process all of the method operations disclosed herein as embodiments of the invention. In such embodiments, the computerized device includes a memory system, a processor, a communications interface and an interconnection mechanism connecting these components. The memory system is encoded with a load manager (or store process) application that when performed on the processor, produces a load manager (or store) process that operates as explained herein within the computerized device to perform all of the method embodiments and operations explained herein as embodiments of the invention.

Other arrangements of embodiments of the invention that are disclosed herein include software programs to perform the method embodiment steps and operations summarized above and disclosed in detail below. More particularly, a computer program product is disclosed that has a computer-readable medium including computer program logic encoded thereon that when performed in a computerized device provides associated operations explained herein. The computer program logic, when executed on at least one processor with a computing system, causes the processor to perform the operations (e.g., the methods) indicated herein as embodiments of the invention. Such arrangements of the invention are typically provided as software, code and/or other data structures arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC) or as downloadable software images in one or more modules, shared libraries, etc. The software or firmware or other such configurations can be installed onto a computerized device to cause one or more processors in the computerized device to perform the techniques explained herein as embodiments of the invention. Software processes that operate in a collection of computerized devices, such as in a group of storage area network management servers, hosts or other entities can also provide the system of the invention. The system of the invention can be distributed between many software processes on several computers, or all processes could run on a small set of dedicated computers or on one computer alone.

BRIEF DESCRIPTION OF THE FIGURES

The advantages of the present invention may be better under stood by referring to the following description taken into conjunction with the accompanying drawings in which:

FIGS. 4 and 5 illustrates exemplary software instructions for operating on the simplified model described herein;

Figure 1A:
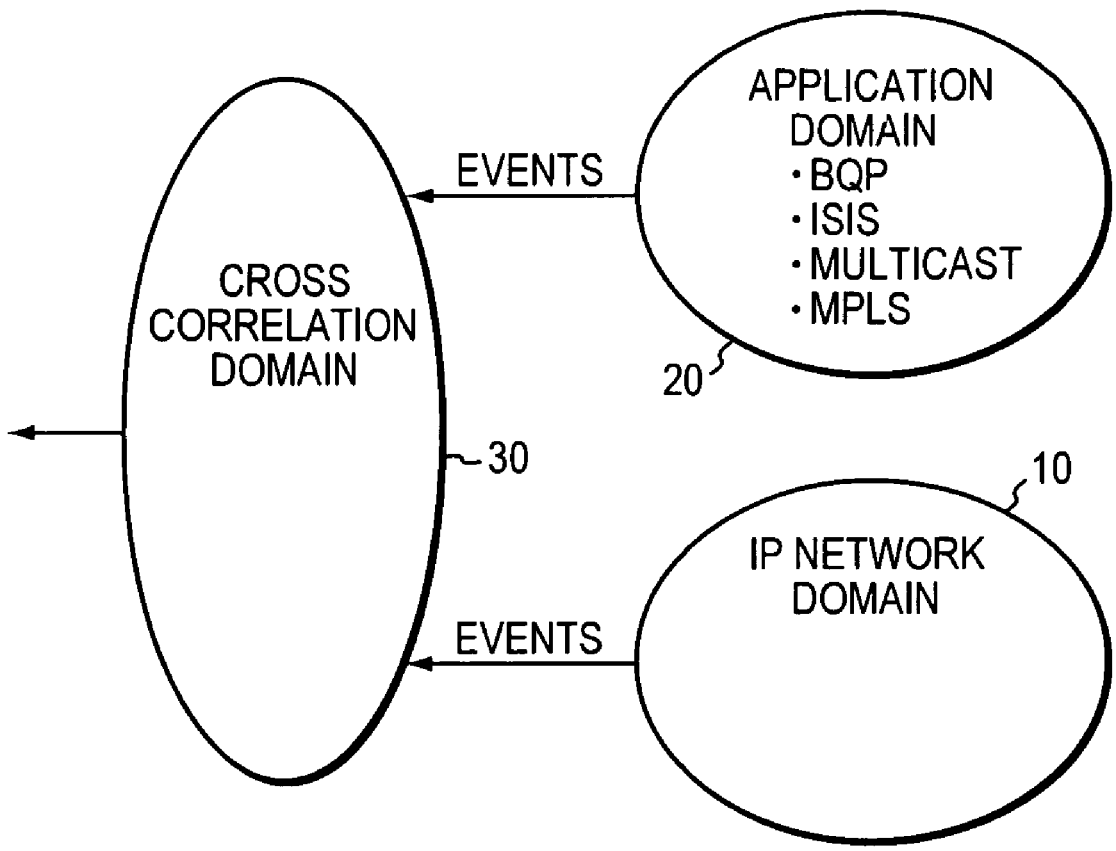
FIG. 1A illustrates an exemplary multi-domain model representation of a convention network.

It is to be understood that these drawings are solely for purposes of illustrating the concepts of the invention and are not intended as a definition of the limits of the invention. The embodiments shown in the figures herein and described in the accompanying detailed description are to be used as illustrative embodiments and should not be construed as the only manner of practicing the invention. Also, the same reference numerals, possibly supplemented with reference characters where appropriate, have been used to identify similar elements

DETAILED DESCRIPTION

FIG. 1A illustrates an exemplary multi-domain model representation of a conventional network. Multi-domain modeling is advantageous as it allows for distribution of common elements and/or functions into individual domains and further allows for scalability as the size or the number of components in the network increases. In this illustrated representation shown, infrastructure elements of an IP network are grouped together and modeled in domain 10. These elements may constitute of hardware and software elements that represent the physical elements of the network. For example, the IP network elements may comprise hardware and software elements that are described in the well-known OSI stack physical layer (layer 1) and data link layer (layer 2). Similarly, applications which are operating on the underlying hardware and software are modeled and processed in domain 20. In this illustrated example, the application domain 20 comprises the elements in the protocol to the application layers, referred to as layers 3-7. Thus, application domain 20 includes processing for BGP, ISIS, Multicast and MPLS protocols, which are well-known layer 3 protocols and other higher layer processing which is not shown.

The results of processing of each of domain 10 and 20, referred to as events, are provided to domain 30. The processing of each domain may be a root-cause analysis of one or more independent and/or related failures that may occur in each domain. Or the processing may be an impact analysis which may determine the events that may occur depend upon the occurrence of one or more failures. Root cause analysis and/or impact analysis such at that described in commonowned, co-pending U.S. patent application Ser. No. 11/263,689 entitled "Apparatus and Method for Event Correlation and Problem Reporting," and U.S. Pat. Nos. 7,003,433, 6,8, 68,367, 6,249,755 5,661,668, and 5,528,516, issued to Yemini, Y., which are incorporated by reference herein, may be performed by each of the illustrated domains. It would also be recognized that the method described herein may be used to perform a system analysis that includes: fault detection, fault monitoring, performance, congestion, connectivity, interface failure, node failure, link failure, routing protocol error, routing control errors, and root-cause analysis.

Cross-correlation domain 30 performs a cross-correlation operation of the provided information to determine, for example, the root cause of symptoms that may result from processing IP network domain 10 and/or Application domain 20. In one case, the results of the processing of domains 10 and 20 may provide duplicate information as an error in domain 10 may introduce, invoke or cause to be generated errors in domain 20. Cross-correlation domain 30 sorts the received data to determine a single causing event from the plurality of symptoms or observed events. The determined causing event is then forward to a next processing system (not shown), such as a display system.

Although a failure may occur in one or more modeled components, symptom(s), detectable events, or observed events, may, or may not, be generated to indicate that a component is experiencing failures. A root-cause analysis correlation must be powerful enough to be able to deal with scenarios in which symptoms are generated, and are not generated, to indicate the cause of the failure. As is described in the aforementioned US Patents and patent application, a determination of a measure of the elements of a causality matrix may be used to determine the most likely root cause of the one or more of the symptoms or observed events. Similarly, in the case of multiple domains, the mostly likely event (s) associated with each domain may be correlated to determine a most-likely event(s). In this case, the symptoms or observable events may be associated with components or elements associated with at least two domains—i.e., an intersection point or an association—and the analysis may be preformed with regard to these intersection points.

In this illustrated example, the events, symptoms, status and problems are passed between to the cross-correlation domain 30 which must include information regarding the IP network domain 10 and the Application domain 20. For example, the Application domain 20 may include only information associated with OSI stack layer 3 processing, or may include only information associated with OSI stack layer 7 or information with regard to any combination of layers inbetween. Thus, as the IP network domain may be common for a number of different Application domains 20, the crosscorrelation domain must have specific knowledge of the IP network domain 10 and the different Application domains 20.

Figure 1B:
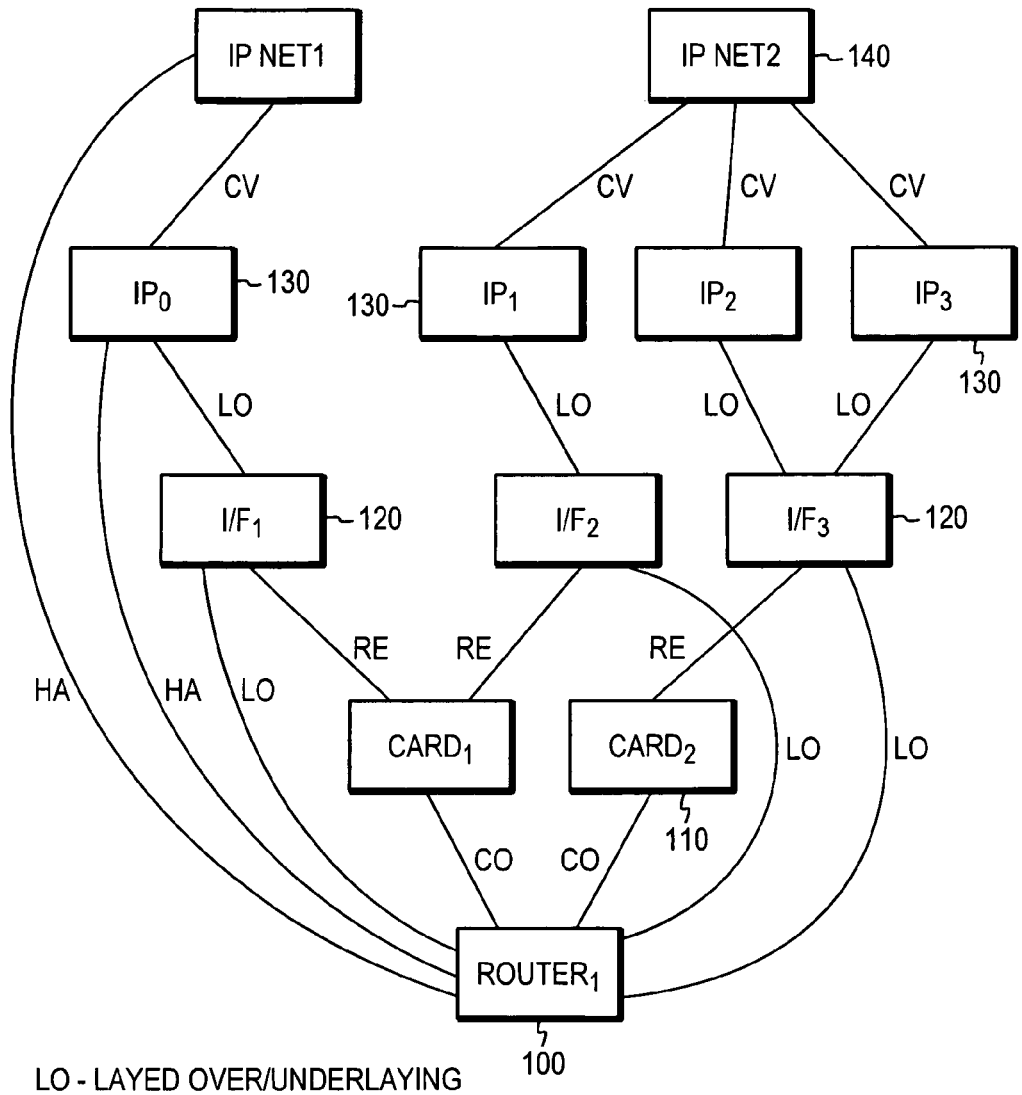
FIG. 1B illustrates an exemplary model representation of a conventional network.

FIG. 1B illustrates an exemplary representation of a layer 1 and 2 network model. In this illustrated case, router 100 includes a plurality of cards 110 and each card includes one or more interfaces 120. Each of the interfaces $I/F_0$-$I/F_4$, 120 are associated with model representations of IP networks 130, which are connected to associated IP networks 140.

Also illustrated are the relationships among the modeled elements. For example, router 100 posses a "composed of/part of" relation to card 100, as router 100 is composed of the cards and the cards of part of the router. Router 100 further possesses a layered-over/underlying relationship to each of the interfaces on each card. Similarly, router 100 possesses a hosted on/hosted by relationship with each of the IP networks associated with each associated interface.

The exemplary modeled router component shown in FIG. 1B illustrates the complexity of the IP network domain 10, (FIG. 1A), that knowledge of which is required by the cross-correlation domain 30. Information regarding the relationships between elements in the higher level Application domain 20 must be similarly available to Cross-correlation domain 30. However, this information is unique to particular application domain and requires unique knowledge to prepare.

Figure 2A:
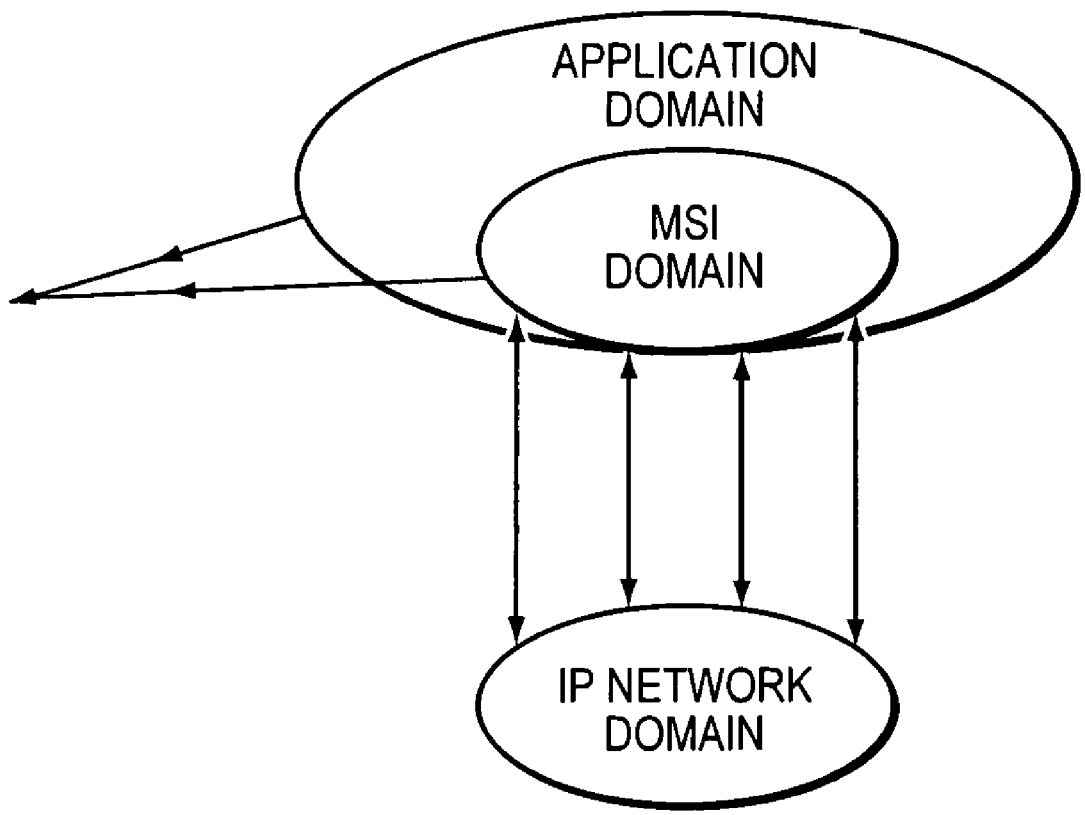
FIG. 2A illustrates an exemplary multi-domain model representation of a convention network incorporating a simplified model representation in accordance with the principles of the invention.

FIG. 2A illustrates an exemplary multi-domain model representation in accordance with the principles of the invention. In this exemplary representation a simplified model representation 10' of underlying IP network domain 10 is incorporated into Application domain 20. The simplified model representation 10' provides Application domain 20 with sufficient information regarding the configuration of the IP network domain 10 to provide a context for the information, i.e., events, symptoms, and/or status, etc., that is provided by IP network domain 10, i.e., remote events. With information regarding the underlying IP network configuration and events, Application domain 20 is able to perform a cross-correlation between the provide remote events and internally generated events to determine a root cause, for example, events generated by each domain. That is, Application domain 20 may evaluate internally observed events in conjunction with the externally provided observed events from IP network domain 10 and determine a most-likely event that caused the observed events.

Figure 2B:
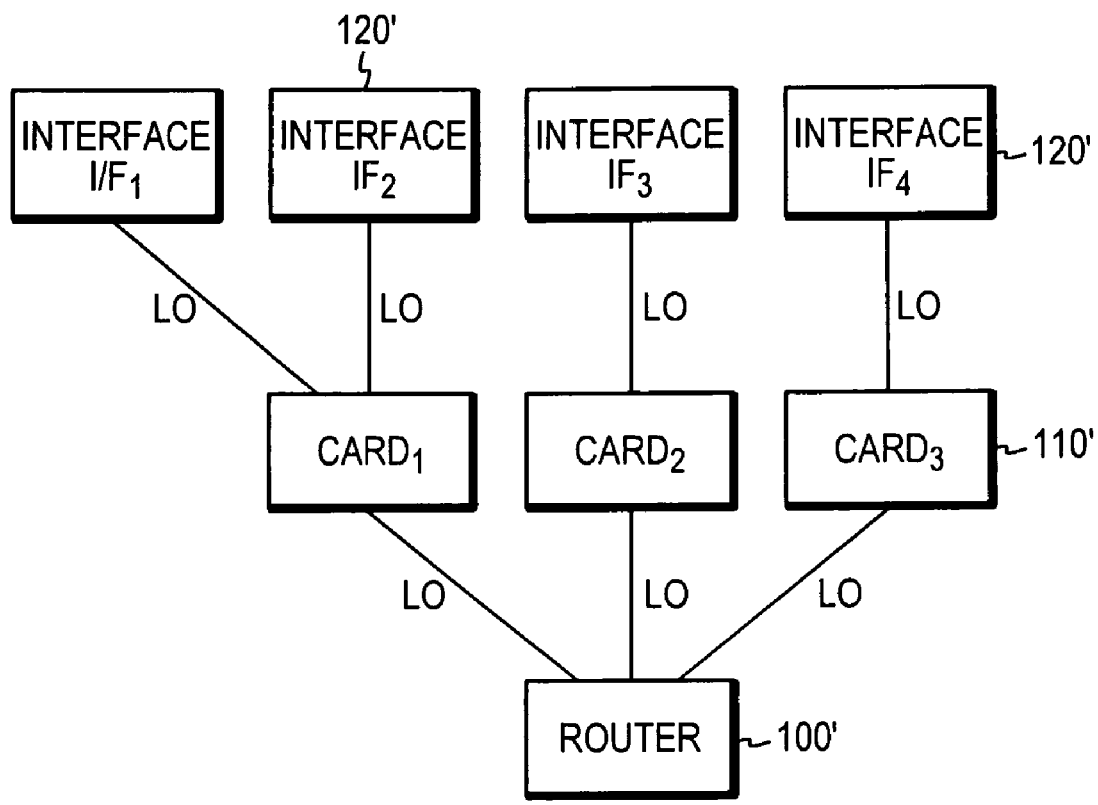
FIG. 2B illustrates a simplified model representation of the network shown in FIG. 1B in accordance with the principles of the invention.

FIG. 2B illustrates an exemplary simplified model representation of the IP network shown in FIG. 1B in accordance with the principles of the invention. In this simplified model representation, a relationship is expressed between directly adjacent ones of the components and/or elements to be managed. For example, router 100' possesses a single relationship to each of the cards within the router and each of the cards 110' possesses a single relationship to each of the managed interfaces. In the illustrated example, a layered-over relationship is shown but it would be recognized that any type of relationship may be selected.

Hence, in accordance with the principles of the invention, a simplified model representation is sufficient to provide context of the operational capabilities of the managed elements in the IP network.

Figure 3:
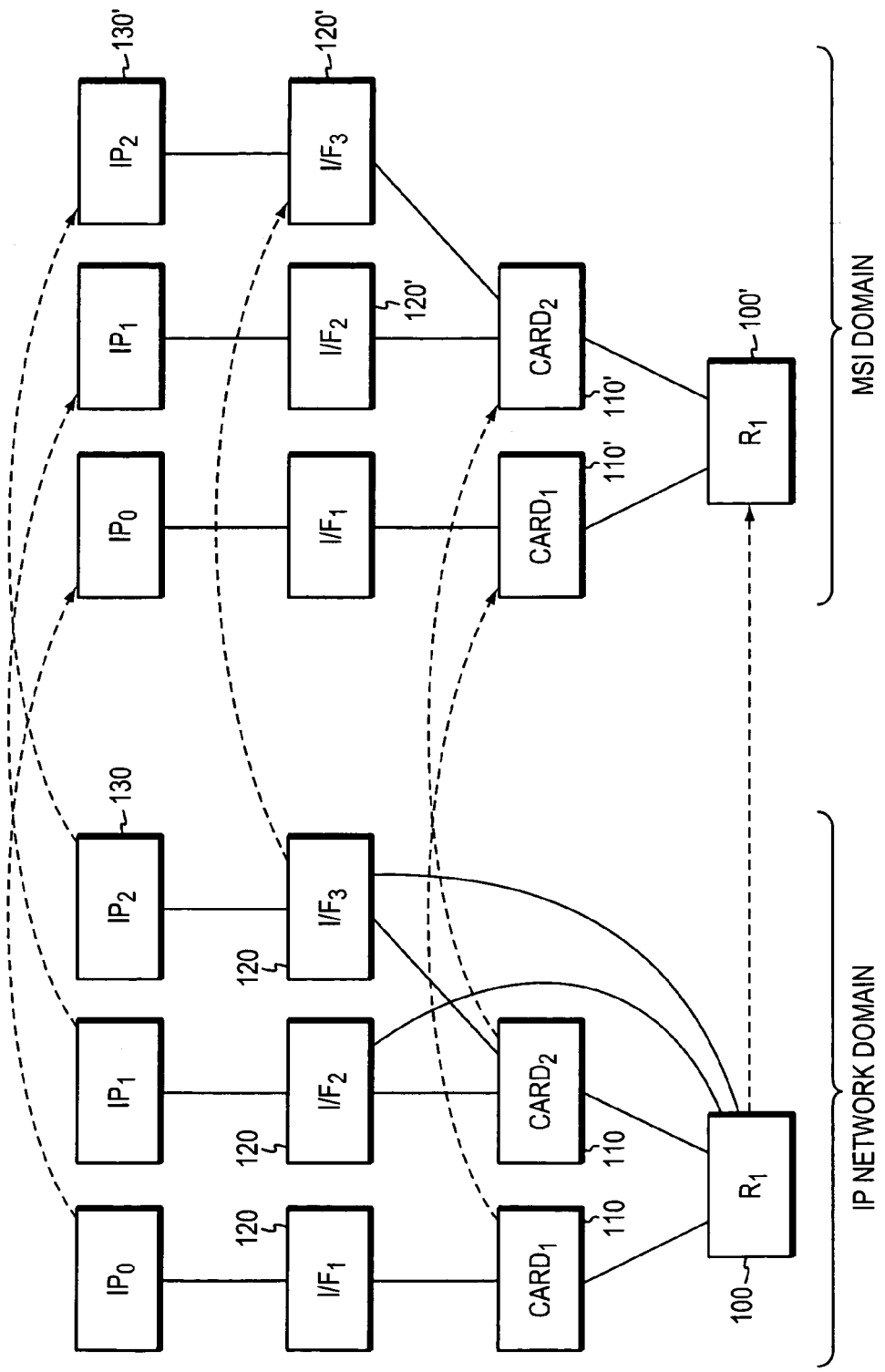
FIG. 3 illustrates the relationship between objects of the exemplary models shown herein.

FIG. 3 illustrates the relationship between modeled components in the IP network domain and their comparables, i.e., proxies, in the MSI domain. As illustrated there is a one-to-one correspondence between components, elements or objects in the IP network domain and their proxies in the second domain. However, the complex relationships between objects in the IP network domain are replaced by the single relationship between directly adjacent proxy objects in the MSI domain. Although the term "adjacent" has been used herein, one would recognize that the term is used to represent the logical relationship between the objects and not a bordering or adjoining relationship.

FIG. 4 illustrates exemplary software instructions for creating managed objects in the simplified model in accordance with the principles of the invention. The objects formed are not dependent upon, or specific to, the configuration of the network but rather represent properties, characteristics and attributes of components that are used to form a network. For example object "interface Card: MSI_Element," represents a type of physical container that can be plugged into another card or hosting board or is itself a hosting board or a motherboard in a chassis. The Card object class includes any package capable of carrying signals and providing a mounting point for physical components such as chips or other physical packages. Similarly, objects UnitaryComputerSystem and NetworkConnection represent computer systems and network connections of the simplified infrastructure model. As would be recognized, the objects presented herein are not specific to any configuration and represent characteristics, i.e., parameters and attributes, of the underlying physical entity.

FIG. 5 illustrates exemplary software instructions for analyzing and determining the root cause of a symptom or an observable event that may be detected by the simplified infrastructure 10' contained in Application domain 20. In this illustrative software instruction, an iterative process may be performed on each managed component or object through the single relationship, shown in 2B rather than processing each of the individual relationships associated with the managed components (i.e., FIG. 1B). In this illustrated case, the MSI_Element class is defined to cause the local symptoms for the remote problems wherein the symptoms are propagated via the single relationship "underlying" down to the source of the problem.

Figure 6:
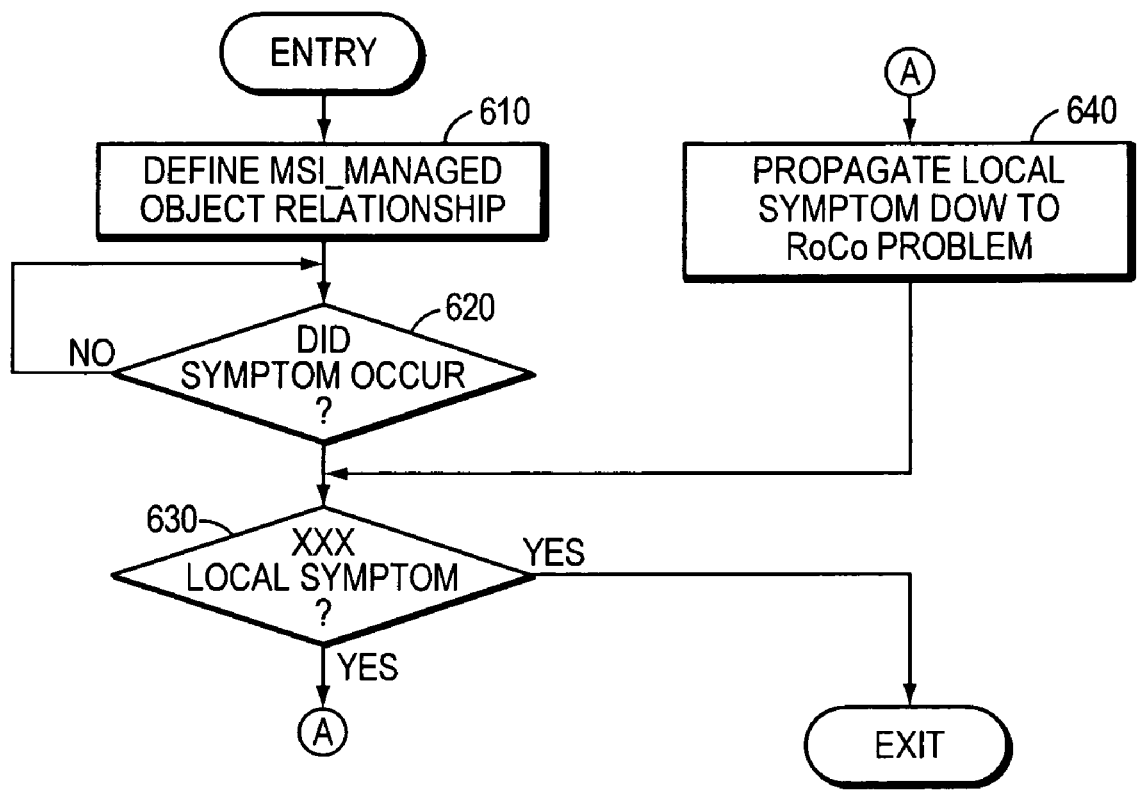
FIG. 6 illustrates a flowchart of an exemplary process for operating on the simplified model described herein.

FIG. 6 illustrates a flow chart of the exemplary process shown in FIG. 5. At block 610, the managed objects and the single relationship between each of the objects are defined, similar to that shown in FIG. 4. At block 620 a determination is made whether a symptom has occurred. If the answer is negative, then processing continues to await the detection of a symptom or observable event. However, if the answer is in the affirmative, then at block 630, then a determination is made at each managed object whether a local symptom has been detected. If the answer is negative, then the cause of the observed event has been determined. Otherwise, the relationship between the current object and the next object is traversed to access the next object, at block 640. The processing at block 630 is iteratively repeated on each of the next accessed objects as previously described.

Embodiments of the present application disclosed herein include software programs to implement the embodiments and operations disclosed herein. For example, a computer program product including a computer-readable medium encoded with computer program logic (software in a preferred embodiment). The logic is configured to allow a compute system to execute the functionality described above. One skilled in the art will recognize that the Logic may also be loaded into conventional computer memory and executed by a conventional CPU. The implementations of this invention may take the form, at least partially, of program code (i.e., instructions) embodied in tangible media, such as floppy diskettes, CD-ROMs, hard drives, random access or read only-memory, or any other machine-readable storage medium or downloaded from one or more network connections. When the program code is loaded into and executed by a machine, such as a computer, the machine becomes an apparatus for practicing the invention. The implementations of the present invention may also be embodied in the form of program code that is transmitted over some transmission medium, such as over electrical wiring or cabling, through fiber optics, or via any other form of transmission. This may be implemented so that when the program code is received and loaded into and executed by a machine, such as a computer, the machine becomes an apparatus for practicing the invention. When executed in a computer's memory by a processing unit, the logic reconfigures a general purpose digital computer into a special purpose digital computer enabled for implementing the functionality discussed herein. When implemented on a general-purpose processor, the program code combines with the processor of the computer to provide a unique apparatus that operates analogously to specific logic circuits.

One more particular embodiment of the present application is directed to a computer program product that includes a computer readable medium having instructions stored thereon for supporting management and viewing of configurations associated with a storage area network. The instructions, when carried out by a processor of a respective computer device, cause the processor to facilitate sequential graphical user interface input. Other embodiments of the present application include software programs to perform any of the functionality disclosed in detail above.

Figure 7:
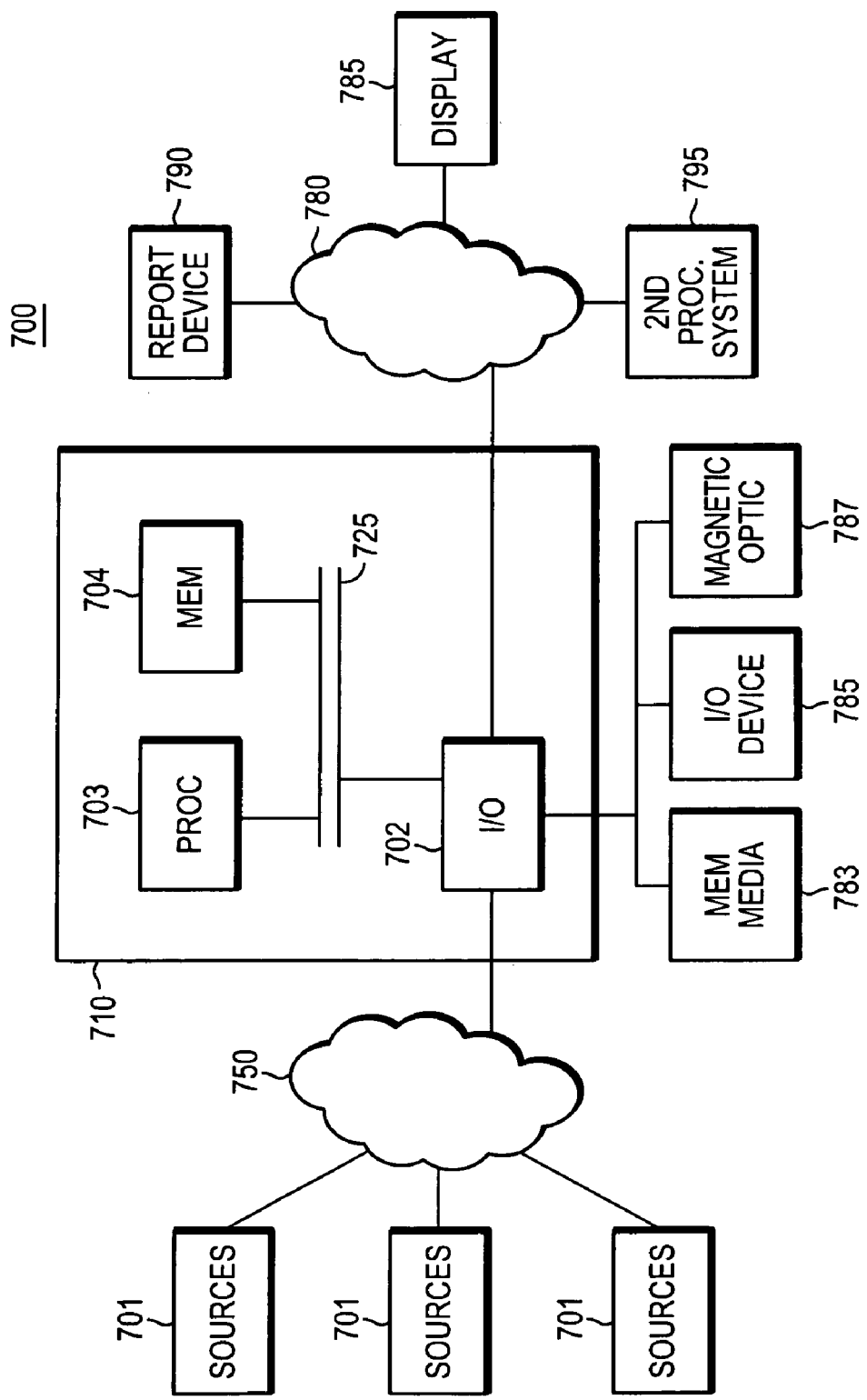
FIG. 7 illustrates an exemplary embodiment of a system that may be used for implementing the principles of the present invention.

FIG. 7 illustrates an exemplary embodiment of a system 700 that may be used for implementing the principles of the present invention. System 700 may contain one or more input/output devices 702, processors 703 and memories 704. I/O devices 702 may access or receive information from one or more sources or devices 701. Sources or devices 701 may be devices such as routers, servers, computers, notebook computer, PDAs, cells phones or other devices suitable for transmitting and receiving information responsive to the processes shown herein. Devices 701 may have access over one or more network connections 750 via, for example, a wireless wide area network, a wireless metropolitan area network, a wireless local area network, a terrestrial broadcast system (Radio, TV), a satellite network, a cell phone or a wireless telephone network, or similar wired networks, such as POTS, INTERNET, LAN, WAN and/or private networks, e.g., INTRANET, as well as portions or combinations of these and other types of networks.

Input/output devices 702, processors 703 and memories 704 may communicate over a communication medium 725. Communication medium 725 may represent, for example, a bus, a communication network, one or more internal connections of a circuit, circuit card or other apparatus, as well as portions and combinations of these and other communication media. Input data from the client devices 701 is processed in accordance with one or more programs that may be stored in memories 704 and executed by processors 703. Memories 704 may be any magnetic, optical or semiconductor medium that is loadable and retains information either permanently, e.g. PROM, or non-permanently, e.g., RAM. Processors 703 may be any means, such as general purpose or special purpose computing system, such as a laptop computer, desktop computer, a server, handheld computer, or may be a hardware configuration, such as dedicated logic circuit, or integrated circuit. Processors 703 may also be Programmable Array Logic (PAL), or Application Specific Integrated Circuit (ASIC), etc., which may be "programmed" to include software instructions or code that provides a known output in response to known inputs. In one aspect, hardware circuitry may be used in place of, or in combination with, software instructions to implement the invention. The elements illustrated herein may also be implemented as discrete hardware elements that are operable to perform the operations shown using coded logical operations or by executing hardware executable code.

As stated previously, the processes shown herein may be represented by computer readable code stored on a computer readable medium. The code may also be stored in the memory 704. The code may be read or downloaded from a memory medium 783, an I/O device 785 or magnetic or optical media, such as a floppy disk, a CD-ROM or a DVD, 787 and then stored in memory 704. Alternatively, the code may be downloaded over one or more of the illustrated networks or a network which is not illustrated but in communication with processing system 710. As would be appreciated, the code may be processor-dependent or processor-independent. JAVA is an example of processor-independent code. JAVA is a trademark of the Sun Microsystems, Inc., Santa Clara, Calif. USA.

Information from device 701 received by I/O device 702, after processing in accordance with one or more software programs operable to perform the functions illustrated herein, may also be transmitted over network 780 to one or more output devices represented as display 785, reporting device 790 or second processing system 795.

It is to be understood that the system of the present application can be embodied solely as a software program, or as a software program operating in conjunction with corresponding hardware. For example, embodiments of the present application may be implemented in EMC's Control Center (ECC) software application that provides graphical management functionality of storage area network resources. Embodiments of the present application may also be implemented in computer devices that operate the Control Center (ECC) software. Control Center software is manufactured by EMC Corporation of Hopkinton, Mass., USA.

Other embodiments are within the scope of the following claims. For example, the software may be implemented using any of a variety of programming tools, such as Microsoft Visual Basic and/or Visual C++. Similarly, embodiments of the invention may operate under one or more well-known computer operating systems (e.g., Unix, Linux, Windows.

While this invention has been particularly shown and described with references to preferred embodiments thereof, it will be understood by those skilled in the art that various changes in form and details may be made therein without departing from the spirit and scope of the invention as defined by the appended claims. Such variations are intended to be covered by the scope of this invention.

As such, the foregoing description of embodiments of the invention is not intended to be limiting. Rather, any limitations to embodiments of the invention are presented in the following claims.

What is claimed is:

1. A computer-implemented method in which a computer system accesses instructions from a storage medium for performing a system analysis, the computer executes the instructions to perform operations for the method comprising the steps of:

representing, in the computer system, selected ones of the plurality of components of a first domain of a computer system model represented as a plurality of independent model domains; wherein each model domain represents selected ones of a plurality of hardware and software system components;

representing select relationships of the components, in the computer system, wherein the relationships among the components are limited to direct relationships among adjacent ones of the representation of components of the first domain, wherein the first domain representation is available to a second domain of the plurality of independent model domains;

wherein the representing components comprises creating at least one configuration non-specific representation of the selected components, wherein the non-specific representations are selected from the group consisting of: MSI_Element, UnitaryComputerSystem, NetworkConnection; and creating a single configuration non-specific representation of a relation along which the events propagate between adjacent ones of the selected components, wherein the representations of relations are selected from the group consisting of: LayeredOver, and ResidingOn;

providing events occurring in the first domain to the second domain;

providing a mapping between a plurality of causing events and a plurality of observable events occurring among the representation of components of the first domain and a plurality of observable events occurring among the components of the second domain, wherein the mapping is represented as a value associating each causing event with each observable event, and performing the system analysis of the computer system model based on the mapping of causing events and observable events.

2. The method as recited in claim 1, wherein the system analysis is selected from the group from consisting of: fault detection, fault monitoring, performance, congestion, connectivity, interface failure, node failure, link failure, routing protocol error, routing control errors, and root-cause analysis.

3. An apparatus for performing a system analysis, the apparatus comprising:

a processor in communication with a memory, the processor executing code for:

accessing a representation of a first domain of a system represented as a plurality of independent domains, wherein each model domain represents selected ones of a plurality of computer system model components and the relationships among the components contained therein;

wherein each model domain represents selected ones of a plurality of hardware and software system components; and wherein the first domain representation represents, as proxies, selected ones of the plurality of components of the first domain, and the relationships among the components are limited to relationships among adjacent ones of the components; wherein the representation of components comprises creating at least one configuration non-specific representation of the selected components, wherein the non-specific representations are selected from the group consisting of: MSI_Element, UnitaryComputerSystem, NetworkConnection; and creating a single configuration non-specific representation of a relation along which the events propagate between adjacent ones of the selected components, wherein the representations of relations are selected from the group consisting of: LayeredOver, and ResidingOn;

receiving observable events occurring in the first domain by the second domain;

providing a mapping between a plurality causing events and a plurality of observable events occurring among the proxy components of the first based and a plurality of observable events occurring among the components of the second domain, wherein the mapping is represented as a value associating each causing event with each observable event; and performing the system analysis of the computer system model based on the mapping of causing events and observable events.

4. The apparatus as recited in claim 3, wherein the system analysis is selected from the group from consisting of: fault detection, fault monitoring, performance, congestion, connectivity, interface failure, node failure, link failure, routing protocol error, routing control errors, and root-cause analysis.

5. The apparatus as recited in claim 3, further comprising:

an input/output device, in communication with the processor.

6. The apparatus as recited in claim 3, wherein the code is stored in the memory.

7. A computer-program product providing instruction to a computer system for performing a system analysis, the instruction causing the computer system to execute the steps of:

accessing a representation of a first domain of a system represented as a plurality of independent domains, wherein each model domain represents selected ones of a plurality of computer system model components and the relationships among the components contained therein; wherein each model domain represents selected ones of a plurality of hardware and software system components; and wherein the first domain representation represents, as proxies, selected ones of the plurality of components of the first domain, and the relationships among the components are limited to relationships among adjacent ones of the components; wherein the representation of components comprises creating at least one configuration non-specific representation of the selected components, wherein the non-specific representations are selected from the group consisting of: MSI_Element, UnitaryComputerSystem, NetworkConnection; and creating a single configuration non-specific representation of a relation along which the events propagate between adjacent ones of the selected components, wherein the representations of relations are selected from the group consisting of: LayeredOver, and ResidingOn;

receiving observable events occurring in the first domain by the second domain;

accessing a mapping, between a plurality causing events and a plurality of observable events occurring among the proxy components of the first based and a plurality of observable events occurring among the components of the second domain, wherein the mapping is represented as a value associating each causing event with each observable event; and performing the system analysis of the computer system model based on the mapping of causing events and observable events.

8. The computer-program product as recited in claim 7, wherein the system analysis is selected from the group from consisting of: fault detection, fault monitoring, performance, congestion, connectivity, interface failure, node failure, link failure, routing protocol error, routing control errors, and root-cause analysis.

9. The computer-product product as recited in claim 7 wherein the instruction is provided to the computer system from a medium selected from the group consisting of: magnetic, optical, and semiconductor.

* * * * *